(12) United States Patent
Shiota et al.

(10) Patent No.: US 7,218,627 B2
(45) Date of Patent: May 15, 2007

(54) ELECTRONIC APPARATUS

(75) Inventors: Shinsuke Shiota, Kawasaki (JP);
Yoshikazu Kobayashi, Kawasaki (JP)

(73) Assignee: NEC Infrontia Corporation (JP)

( * ) Notice: Subject to any disclaimer, the term of this patent is extended or adjusted under 35 U.S.C. 154(b) by 787 days.

(21) Appl. No.: 10/671,495

(22) Filed: Sep. 29, 2003

(65) Prior Publication Data

US 2004/0100931 A1     May 27, 2004

(30) Foreign Application Priority Data

Nov. 26, 2002  (JP)  .......................... 2002/341783

(51) Int. Cl.
*H04Q 7/24*  (2006.01)

(52) U.S. Cl. ................... 370/338; 370/390; 370/401; 455/41.2; 455/422.1; 455/435.1; 455/552.1

(58) Field of Classification Search ............... 370/338, 370/390, 401; 455/412, 421, 422.1, 432.2, 455/435.1, 435.2, 435.3, 552.1, 551, 41.2
See application file for complete search history.

(56) References Cited

U.S. PATENT DOCUMENTS

| 2001/0041568 | A1 | 11/2001 | Hughes |
| 2002/0062385 | A1 | 5/2002 | Dowling |
| 2004/0068571 | A1* | 4/2004 | Ahmavaara ............... 709/228 |
| 2006/0218267 | A1* | 9/2006 | Khan et al. ............... 709/224 |

FOREIGN PATENT DOCUMENTS

| EP | 0 684 707 A1 | 11/1995 |
| EP | 1 207 654 A2 | 5/2002 |
| GB | 2 360 914 A | 10/2001 |
| JP | 7-336294 | 12/1995 |
| JP | 2000-197118 | 7/2000 |
| JP | 2001-223712 | 8/2001 |
| JP | 2002-152276 | 5/2002 |
| JP | 2002-185476 | 6/2002 |
| JP | 2002-251341 | 9/2002 |
| JP | 2004-153387 | 5/2004 |
| WO | WO 02/39210 A2 | 5/2002 |

* cited by examiner

*Primary Examiner*—Joseph Feild
*Assistant Examiner*—Inder Pal Mehra
(74) *Attorney, Agent, or Firm*—Dickstein, Shapiro, LLP.

(57) ABSTRACT

An electronic (or computer) apparatus (10) includes a wireless LAN connecting unit (11) for carrying out Internet connection via a wireless LAN (13) and an enabling arrangement (12) for enabling the wireless LAN connecting unit to carry out Internet connection at either of providing spots (hot spots) (HP#1 and HP#2) which are spaces located at positions different from each other and providing wireless Internet connection services hosted by ISPs different from each other. The enabling arrangement includes a current position acquiring unit (17) for acquiring current position data representative of a current position of the computer apparatus. A current-location providing spot is identified from the current position data and the wireless LAN connecting unit is automatically adapted to an ISP different at each providing spot without the need of manually changing ISP agreement data.

33 Claims, 8 Drawing Sheets

FIG. 1

| SPOT POSITION DATA | CONTRY DATA | SPOT DATA | ISP DATA (PROVIDER DATA) |
|---|---|---|---|
| (N, E) = ("......", "......", "......") | JAPAN | HAMBURGER SHOP SUMIDA | ISP1 |
| (N, E) = ("......", "......", "......") | JAPAN | COFFEE SHOP SHIBUYA | ISP2 |
| (N, E) = ("......", "......", "......") | JAPAN | HAMBURGER SHOP DAIKANYAMA | ISP1 |
| (N, E) = ("......", "......", "......") | JAPAN | HOTEL AKASAKA | ISP3 |
| (N, W) = ("......", "......", "......") | U.S.A. | COFFEE SHOP NEW YORK | ISP4 |

POSITION DATA TABLE

| SPOT POSITION DATA | SPOT DATA | ISP DATA (PROVIDER DATA) |
|---|---|---|
| (N, E) = (" ....", " ....") | HAMBURGER SHOP SUMIDA | ISP1 |
| (N, E) = (" ....", " ....") | COFFEE SHOP SHIBUYA | ISP2 |
| (N, E) = (" ....", " ....") | HAMBURGER SHOP DAIKANYAMA | ISP1 |
| (N, E) = (" ....", " ....") | HOTEL AKASAKA | ISP3 |
| (N, W) = (" ....", " ....") | COFFEE SHOP NEW YORK | ISP4 |

POSITION DATA TABLE

ELECTRONIC APPARATUS

This application claims priority to prior Japanese patent application JP 2002-341783 filed on Nov. 26, 2220, the disclosure of which is incorporated herein by reference.

BACKGROUND OF THE INVENTION

This invention relates to an electronic apparatus having a wireless LAN connecting unit.

The electronic apparatus is, for example, a computer apparatus, a PDA (Personal Digital Assistant), or the like. The electronic apparatus will also be called a client apparatus which makes use of functions and data provided by a server computer.

A wireless LAN (Local Area Network) is for use in connecting a computer apparatus (for example, a personal computer) to the Internet via wireless connection. The wireless LAN is established between the computer apparatus and a communication apparatus connected to the Internet by providing the computer apparatus with a wireless LAN connecting unit (for example, a wireless LAN adapter such as a wireless LAN card) and providing the communication apparatus with an access point.

A space having the access point and providing a wireless Internet connection service hosted by an ISP (Internet Service Provider) to an unspecified number of general public users is generally called a hot spot. In the present specification, the above-mentioned space providing the wireless Internet connection service may be called a providing spot.

At present, the computer apparatus having the wireless LAN connecting unit can not automatically select a wireless LAN communication mode (determined by a radio frequency channel and a transmit power level) in conformity with a wireless specification and radio laws and regulations of each individual country. Therefore, in case where the wireless LAN connecting unit equipped in the computer apparatus does not match the wireless specification and the radio laws and regulations of a country where a user currently stays or lives, the wireless LAN connecting unit equipped in the computer apparatus is replaced by another wireless LAN connecting unit which matches the wireless specification and the radio laws and regulations of the country.

It is assumed that the computer apparatus having a wireless LAN connecting unit is used in a plurality of providing spots (hot spots) hosted by a plurality of ISPs different from one another. In this event, when the computer apparatus is brought to each providing spot, it is required for a user to ask a manager of each providing spot about an ISP hosting the providing spot and setup data and to manually change the setup data such as authentication information.

Japanese Unexamined Patent Publication No. JP 2002-185476 A (corresponding to EP 1207654 A2) (which will be referred to as Reference 1) discloses the technique for use in frequency coordination between two different wireless network protocols, such as the IEEE 802.11 protocol and the Bluetooth protocol.

The coordination is accomplished by the use of a first radio transceiver operating in accordance with a first communication protocol (which may be the 802.11 protocol) and using a frequency band (which may be 2.4 GHz), a base station connected to a wired network and op rating in accordance with the first communication protocol, a second radio transceiver operating in accordance with a second communication protocol (which may be the Bluetooth protocol) and using the above-mentioned frequency band, and a coordinator associated with the base station for, in turn, activating the first radio transceiver, deactivating the first radio transceiver, activating the second radio transceiver, and deactivating the second radio transceiver.

Japanese Unexamined Patent Publication No; JP 07-336294 A (corresponding to EP 0684707 A1) (which will be referred to as Reference 2) describes that national regulations of each country set a maximum limit on the amount of effective isotropic radiated power (EIRP) which may be emitted from a particular type of antenna being used for a particular application. Reference 2 discloses a cellular radio base station arrangement capable of controlling transmit power so that the transmit power does not exceed the maximum limit of EIRP defined by the national regulations.

Japanese Unexamined Patent Publication No. JP 2001-223712 A (which will be referred to as Reference 3) discloses an information retrieval service system capable of reliably providing a wireless terminal user of a wide-area wireless network with area information regarding an area in which the user is present and guide information regarding stores, shops and so on located in the neighborhood.

Japanese Unexamined Patent Publication No. JP 2002-152276 A (which will be referred to as Reference 4) discloses a method which enables a personal terminal to be used in an Internet connection environment of a public spot so as to use the same ISP (Internet Service Provider) at home and at the public spot.

As described above, in case where the computer apparatus having the wireless LAN connecting unit is used abroad, the computer apparatus may not be connected to the wireless LAN due to the difference in standard or radio laws and regulations from country to country. If the wireless LAN connecting unit itself can not be used in a destination country, another wireless LAN connecting unit having a specification adapted to the destination country must be purchased or borrowed there.

In the computer apparatus having a radio LAN connecting unit, it is impossible, at present, to automatically select ISP agreement data in conformity with an ISP different at each providing spot (hot spot). Therefore, setup data of the ISP agreement data must be changed manually.

SUMMARY OF THE INVENTION

It is an object of this invention to provide an electronic apparatus (for example, a computer apparatus or a client apparatus) having a wireless LAN connecting unit, which comprises a current position data acquiring unit for acquiring current position data representative of a current position of the computer apparatus (or the client apparatus) and which is capable of identifying a current-location area (country or state) from the current position data and automatically changing a wireless LAN communication mode (determined by a radio frequency channel and a transmit power level) in conformity with a wireless specification and radio laws and regulations of each area.

It is another object of this invention to provide a computer apparatus (or a client apparatus) having a wireless LAN connecting unit, which comprises a current position data acquiring unit for acquiring current position data representative of a current position of the computer apparatus (or the client apparatus) and which is capable of identifying a current-location providing spot (hot spot) from the current position data and automatically adapting the wireless LAN connecting unit to an ISP different at each providing spot (hot spot) without the need of manually changing ISP agreement data.

According to a first aspect of this invention, there is provided a computer apparatus comprising:

a wireless LAN connecting unit for carrying out Internet connection via a wireless LAN; and an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other:

the enabling arrangement comprising:

a current position data output unit for producing current position data representative of a current position of the computer apparatus;

a position data table memorizing, in correspondence to first and second spot data representative of the first and the second providing spots, first and second spot position data representative of the first and the second positions, first and second area data representative of first and second areas including the first and the second providing spots, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the computer apparatus and the first and the second ISPs;

an area data and ISP data output unit, responsive to the current position data and referring to the position data table, for identifying as specific spot data one of the first and the second spot data which corresponds to one of the first and the second spot position data which coincides with the current position data, producing as specific area data one of the first and the second area data which corresponds to the specific spot data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

According to a second aspect of this invention, there is provided a computer apparatus comprising:

a wireless LAN connecting unit for carrying out Internet connection via a wireless LAN; and an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;

the enabling arrangement comprising:

a current position data output unit for producing current position data representative of a current position of the computer apparatus;

a position data table memorizing, in correspondence to first and second spot data representative of the first and the second providing spots, first and second spot position data representative of the first and the second positions, first and second country data representative of first and second countries including the first and the second providing spots, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the computer apparatus and the first and the second ISPs;

a country data and ISP data output unit, responsive to the current position data and referring to the position data table, for identifying as specific spot data one of the first and the second spot data which corresponds to one of the first and the second spot position data which coincides with the current position data, producing as specific country data one of the first and the second country data which corresponds to the specific spot data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of country data, the wireless LAN connecting unit being responsive to the enable signal and the specific country data and automatically setting, as a selected communication mode, one of the wireless LAN communication modes which corresponds to the specific country data to carry out Internet connection via the wireless LAN in the selected communication mode.

According to a third aspect of this invention, there is provided a computer apparatus comprising:

a wireless LAN connecting unit for carrying out Internet connection via a wireless LAN; and an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;

the enabling arrangement comprising:

a current position data output unit for producing current position data representative of a current position of the computer apparatus;

an area data output unit supplied with the current position data for producing specific area data representative of a specific area including the current position;

a position data table memorizing, in correspondence to first and second spot data representative of the first and the second providing spots, first and second spot position data representative of the first and the second positions, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the computer apparatus and the first and the second ISPs;

an ISP data output unit, responsive to the current position data and referring to the position data table, for identifying as specific spot data one of the first and the second spot data which corresponds to one of the first and the second spot position data which coincides with the current position data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

According to a fourth aspect of this invention, there is provided a client apparatus comprising:

a wireless LAN connecting unit for carrying out Internet connection via a wireless LAN; and an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;

the enabling arrangement comprising:

a current position data output unit for producing current position data representative of a current position of the client apparatus;

a position data table memorizing, in correspondence to first and second spot data representative of the first and the second providing spots, first and second spot position data representative of the first and the second positions, first and second area data representative of first and second areas including the first and the second providing spots, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the client apparatus and the first and the second ISPs;

an area data and ISP data output unit, responsive to the current position data and referring to the position data table, for identifying as specific spot data one of the first and the second spot data which corresponds to one of the first and the second spot position data which coincides with the current position data, producing as specific area data one of the first and the second area data which corresponds to the specific spot data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

According to a fourth aspect of this invention, there is provided According to a fourth aspect of this invention, there is provided a client apparatus comprising:

a wireless LAN connecting unit for carrying out Internet connection via a wireless LAN; and an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;

the enabling arrangement comprising:

a current position data output unit for producing current position data representative of a current position of the client apparatus;

a position data table memorizing, in correspondence to first and second spot data representative of the first and the second providing spots, first and second spot position data representative of the first and the second positions, first and second country data representative of first and second countries including the first and the second providing spots, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the client apparatus and the first and the second ISPs;

a country data and ISP data output unit, responsive to the current position data and referring to the position data table, for identifying as specific spot data one of the first and the second spot data which corresponds to one of the first and the second spot position data which coincides with the current position data, producing as specific country data one of the first and the second country data which corresponds to the specific spot data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of country data, the wireless LAN connecting unit being responsive to the enable signal and the specific country data and automatically setting, as a selected communication mode, one of the wireless LAN communication modes which corresponds to the specific country data to carry out Internet connection via the wireless LAN in the selected communication mode.

According to a sixth aspect of this invention, there is provided According to a fourth aspect of this invention, there is provided a client apparatus comprising:

a wireless LAN connecting unit for carrying out Internet connection via a wireless LAN; and an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;

the enabling arrangement comprising:

a current position data output unit for producing current position data representative of a current position of the client apparatus;

an area data output unit supplied with the current position data for producing specific area data representative of a specific area including the current position;

a position data table memorizing, in correspondence to first and second spot data representative of the first and the second providing spots, first and second spot position data representative of the first and the second positions, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the client apparatus and the first and the second ISPs;

an ISP data output unit, responsive to the current position data and referring to the position data table, for identifying as specific spot data one of the first and the second spot data which corresponds to one of the first and the second spot position data which coincides with the current position data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

None of References 1, 2, 3, and 4 discloses a current position data output unit for producing current position data representative of a current position of a computer apparatus (or a client apparatus), a position data table, an ISP agreement data table, a specific area data output unit responsive to the current position data for producing specific area data representative of a specific area including the current position, an ISP data output unit responsive to the current position data for producing, as specific ISP data, data related to an ISP of a providing spot (hot spot) where the computer apparatus (or the client apparatus) is brought, and an enable signal output unit.

Furthermore, none of References 1, 2, 3, and 4 discloses that, upon reception of the enable signal and the specific area data, a wireless LAN connecting unit automatically selects, as a selected communication mode, one of a plurality of wireless LAN communication modes which corresponds to the specific area data and carries out Internet connection via a wireless LAN in the selected communication mode.

DESCRIPTION OF THE PREFERRED EMBODIMENTS

Now, description will be made of preferred embodiments of this invention with reference to the drawing.

Figure 1:
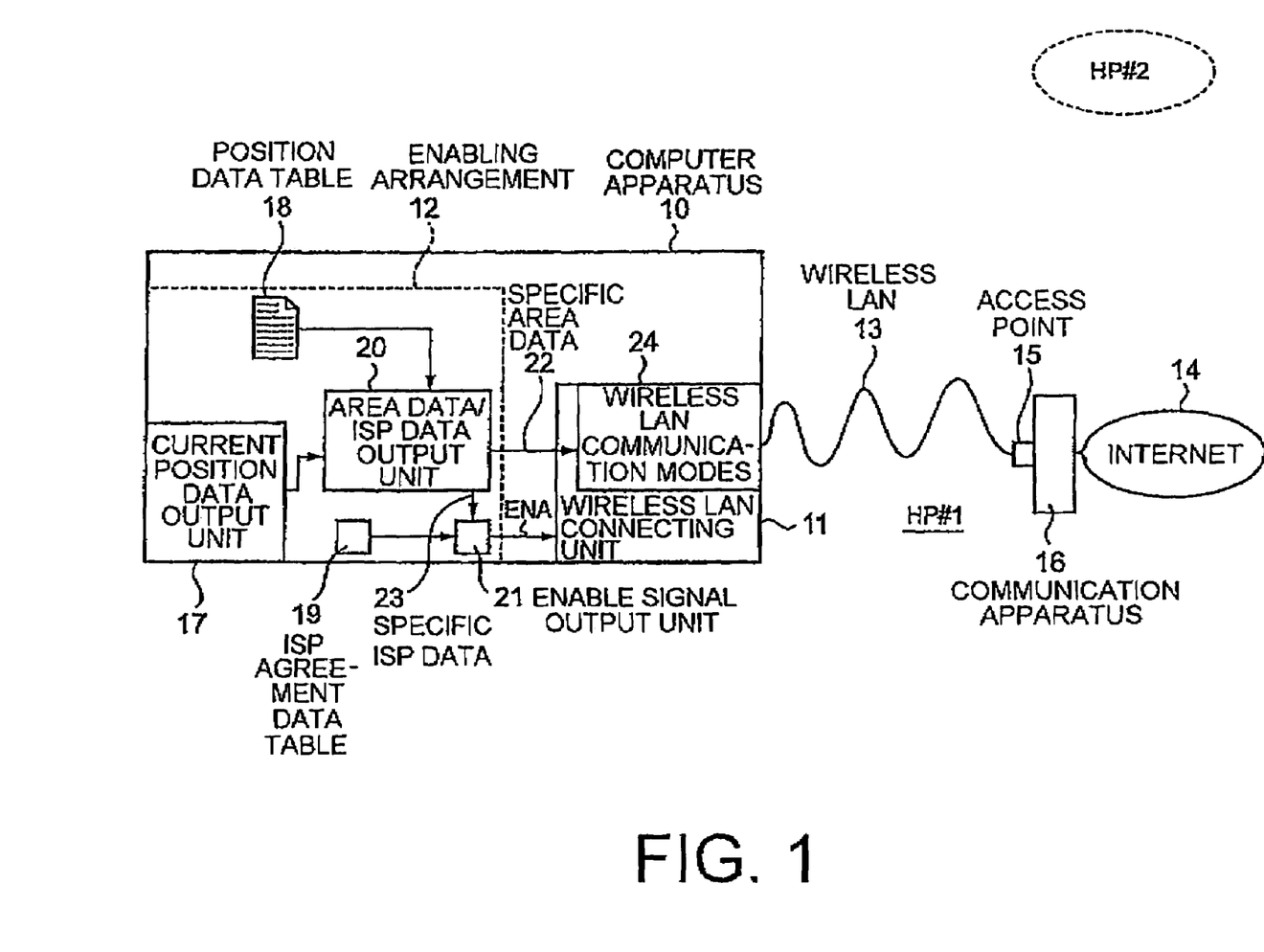
FIG. 1 is a block diagram of a computer apparatus according to a first embodiment of this invention.

Referring to FIG. 1, a computer apparatus 10 according to a first embodiment of this invention is, for example, a personal computer and comprises a wireless LAN connecting unit 11 and an enabling arrangement 12.

The wireless LAN connecting unit 11 carries out connection with the Internet 14 via a wireless LAN (Local Area Network) 13. For example, the wireless LAN connecting unit 11 is a wireless LAN adapter such as a wireless LAN card.

The wireless LAN 13 is established between the computer apparatus 10 and a communication apparatus 16 connected to the Internet 14 by providing the computer apparatus 10 with the wireless LAN connecting unit 11 and providing the communication apparatus 16 with an access point 15.

A hot spot (or providing spot) HP#1 is a space having the access point 15 and providing a wireless Internet connection service hosted by an ISP (internet Service Provider) to an unspecified number of general public users. Another hot spot (or providing spot) HP#2 is located at a different position and hosted by a different ISP.

The enabling arrangement 12 enables the wireless LAN connecting unit 11 to carry out Internet connection via the wireless LAN 13 in either of the first and the second providing spots HP#1 and HP#2 located at first and second positions different from each other and hosted by first and second ISPs different from each other.

The enabling arrangement 12 comprises a current position data output unit 17, a position data table 18, an ISP agreement data table 19, an area data and ISP data output unit 20, and an enable signal output unit 21.

The current position data output unit 17 produces current position data representative of a current position of the computer apparatus 10. The current position data output unit 17 is, for example, a GPS (Global Positioning System) receiver responsive to a GPS signal for producing current position data representative of a current position of the computer apparatus 10. Alternatively, the current position data output unit 17 may be a gyroscope for producing current position data representative of a current position of the computer apparatus 10.

Figure 2:
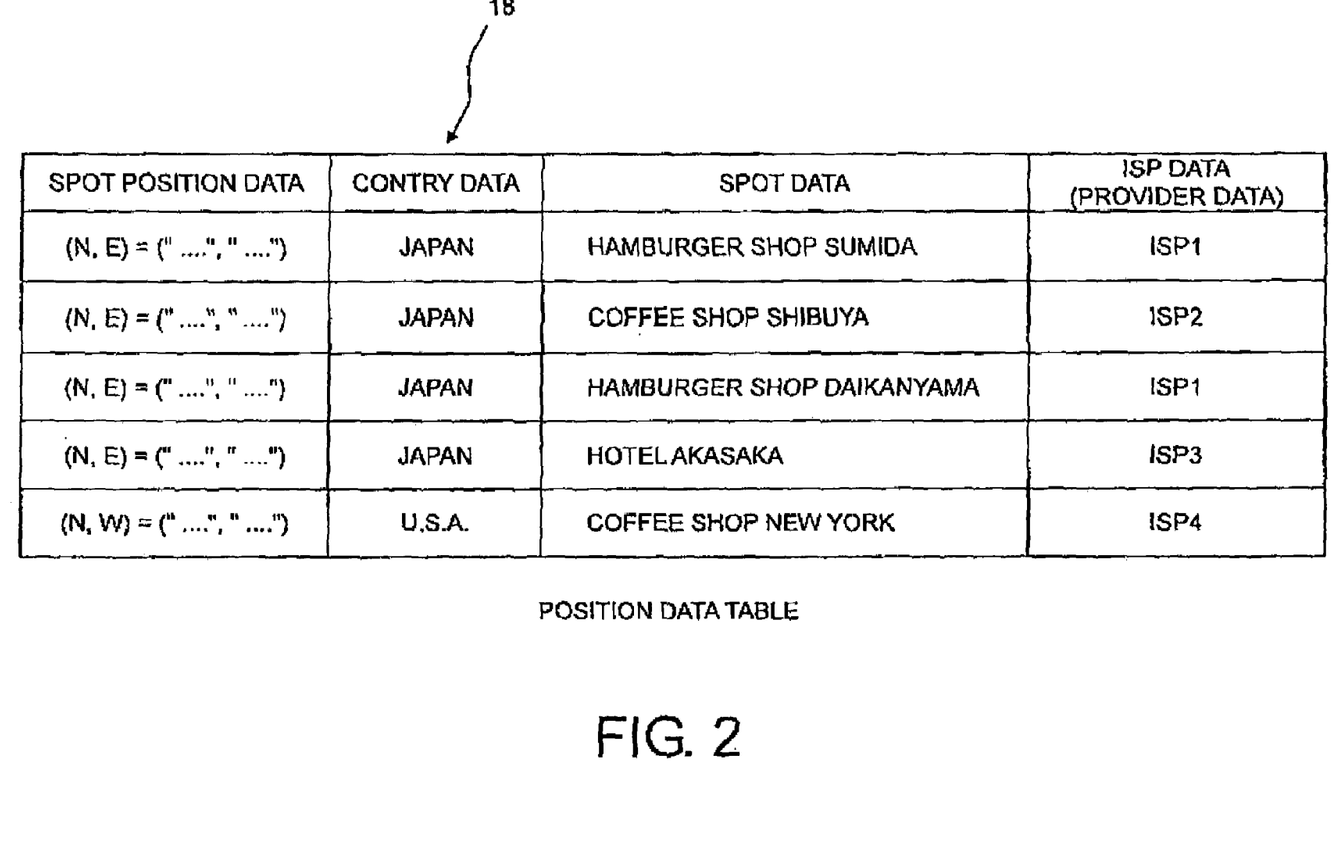
FIG. 2 shows a position data table used in the computer apparatus illustrated in FIG. 1.

Referring to FIG. 2 in addition to FIG. 1, the position data table 18 memorizes, in correspondence to first and second spot data representative of the first and the second providing spots HP#1 and HP#2 (assumed to be Hamburger Shop Sumida and Coffee Shop New York), first and second spot position data representative of the first and the second positions (north latitude N and east longitude E of Hamburger Shop Sumida and north latitude N and west longitude W of Coffee Shop New York), first and second area data (country data in FIG. 2) representative of first and second areas (country or state; Japan and U.S.A. in FIG. 2) including the first and the second providing spots HP#1 and HP#2, and first and second ISP data (provider data) representative of the first and the second ISPs (ISP1 and ISP4 in FIG. 2) hosting the first and the second providing spots HP#1 and HP#2. Similarly, the position data table 18 memorizes spot position data, country data, and ISP data in correspondence to other providing spots (Coffee Shop Shibuya, Hamburger Shop Daikanyama, and Hotel Akasaka).

Figure 3:
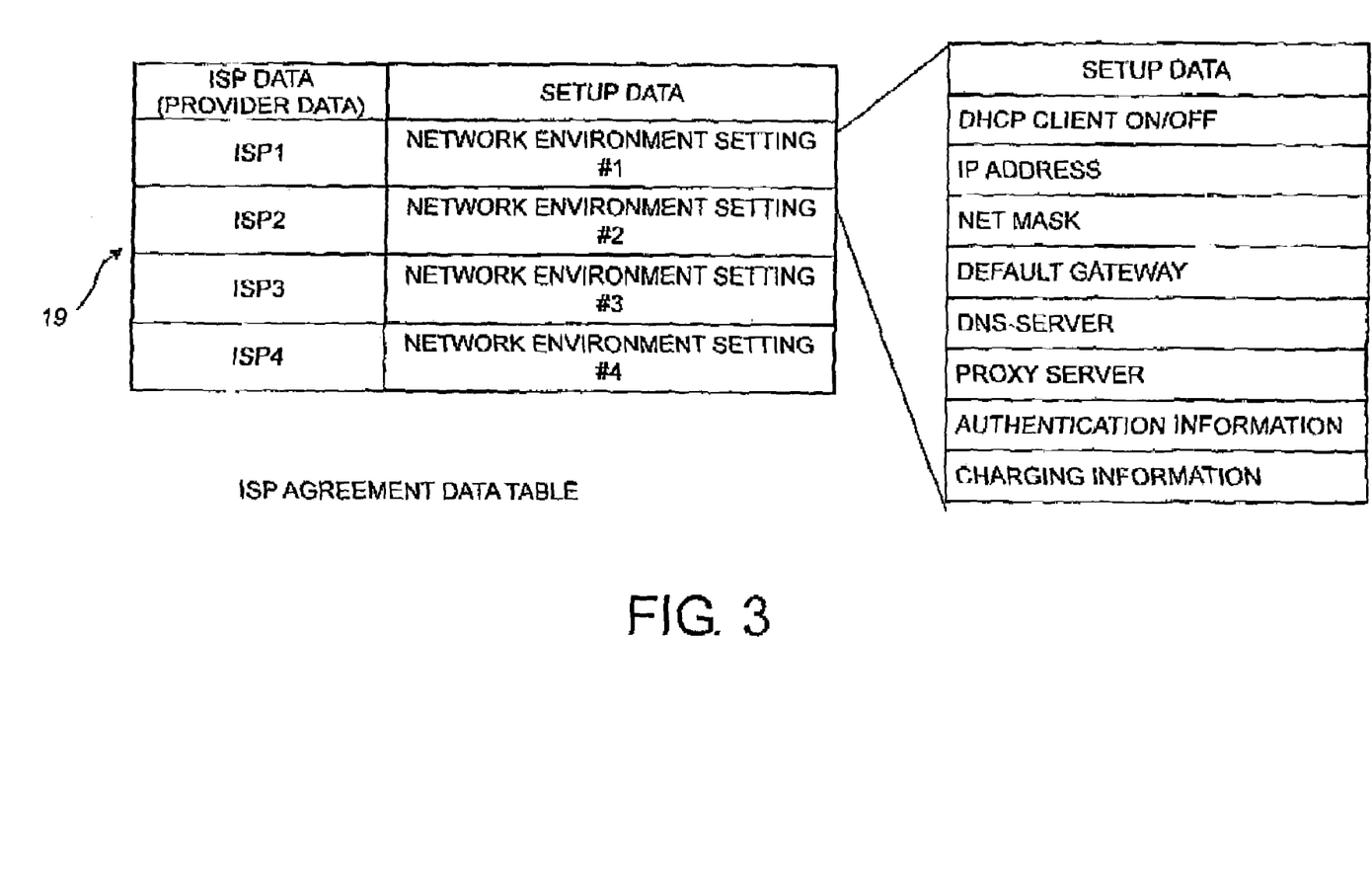
FIG. 3 shows an ISP agreement table used in the computer apparatus illustrated in FIG. 1.

Referring to FIG. 3 in addition to FIG. 1, the ISP agreement data table 19 memorizes, in correspondence to the first and the second ISP data representative of the first and the second ISPs (ISP1 and ISP4), first and second agreement data (setup data) representative of agreements made between a user of the computer apparatus 10 and the first and the second ISPs (ISP1 and ISP4). Similarly, the ISP agreement data table 19 memorizes, in correspondence to the first and the second ISP data representative of other ISPs (ISP2 and ISP3), agreement data (setup data) made between the user of the computer apparatus 10 and other ISPs (ISP2 and ISP3).

For simplicity of description, it is assumed in the following description that the user of the computer apparatus 10 has an agreement only with the first and the second ISPs (ISP1 and ISP4) and that the ISP agreement data table 19 in FIG. 3 memorizes only the first and the second agreement data (setup data) corresponding to the first and the second ISP data representative of the first and the second ISPs (ISP1 and ISP4). Furthermore, the position data table 18 in FIG. 2 memorizes, in correspondence to the first and the second spot data representative of the first and the second providing spots HP#1 and HP#2 (Hamburger Shop Sumida and Coffee Shop New York), the first and the second spot position data representative of the first and the second positions (north latitude N and east longitude E of Hamburger Shop Sumida and north latitude N and west longitude W of Coffee Shop New York), the first and the second area data (country data) representative of the first and the second areas (Japan and U.S.A.) including the first and the second providing spots HP#1 and HP#2, and the first and the second ISP data representative of the first and the second ISPs (ISP1 and ISP4) hosting the first and the second providing spots HP#1 and HP#2.

In FIG. 1, supplied with the current position data from the current position data output unit 17 and referring to the position data table 18, the area data and ISP data output unit 20 identifies, as specific spot data, one of the first and the second spot data which corresponds to one of the first and the second spot position data which coincides with the current position data. The area data and ISP data output unit 20 produces, as specific area data (specific country data) 22, one of the first and the second area data (first and second country data) which corresponds to the specific spot data and produces, as specific ISP data 23, one of the first and the second ISP data which corresponds to the specific spot data.

Supplied with the specific ISP data 23 and referring to the ISP agreement data table 19, the enable signal output unit 21 produces an enable signal ENA in case where the ISP agreement data table 19 memorizes one of the first and the second agreement data in correspondence to one of the first and the second ISP data which coincides with the specific ISP data 23.

The wireless LAN connecting unit 11 is preliminarily given a plurality of wireless LAN communication modes 24 corresponding to a plurality of area data (a plurality of country data). In response to the enable signal ENA and the specific area data 22, the wireless LAN connecting unit 11 automatically sets, as a selected communication mode, one of the wireless LAN communication modes 24 which corresponds to the specific area data 22 and carries out Internet connection via the wireless LAN 13 in the selected communication mode.

Specifically, each of the wireless LAN communication modes 24 corresponding to the area data is determined by a radio frequency channel and a transmit power level used in an area (country) represented by area data (country data) corresponding thereto. The wireless LAN connecting unit 12 carries out Internet connection via the wireless LAN 13 by the use of the radio frequency channel and the transmit power level which determine the selected communication mode.

Figure 4:
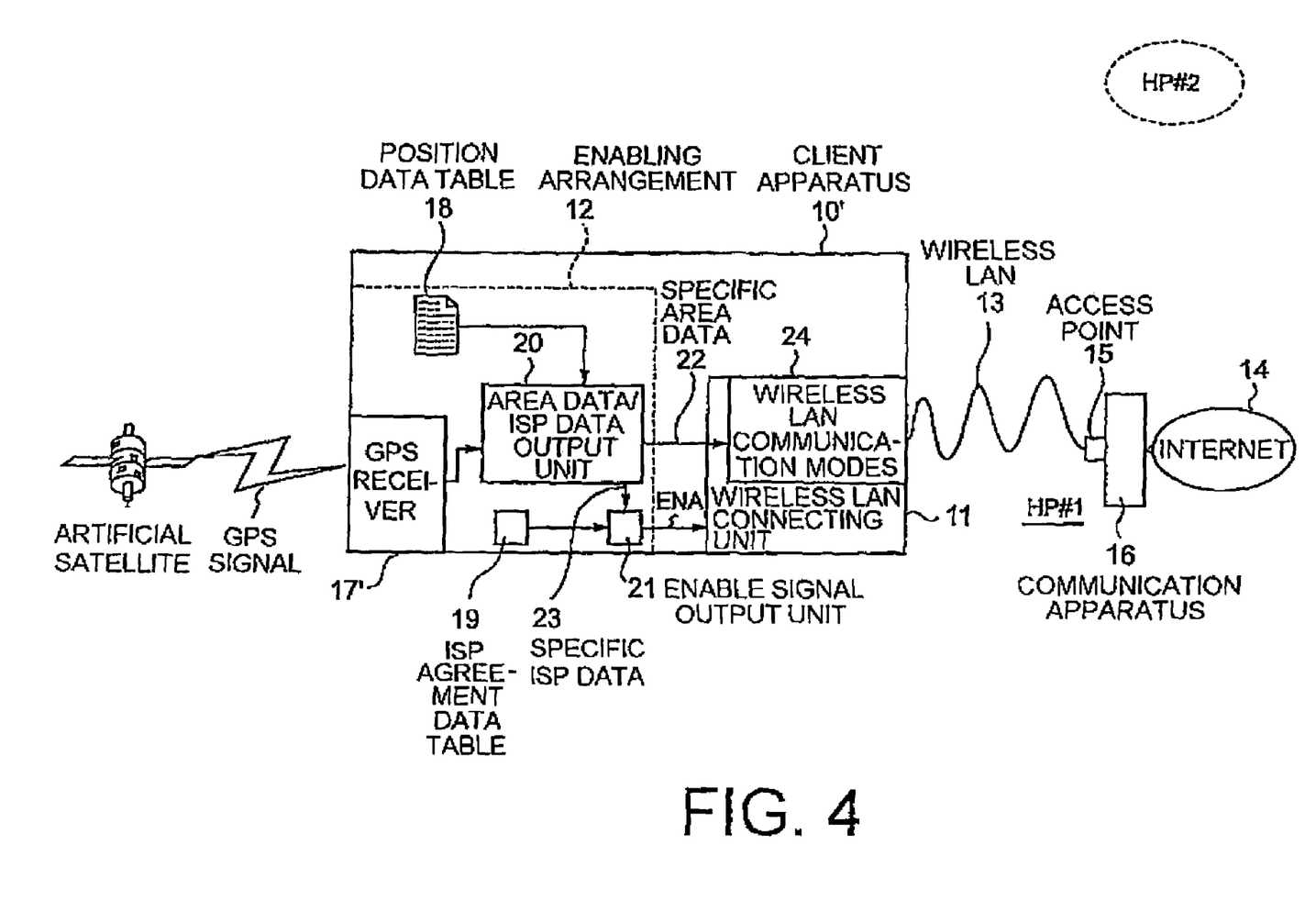
FIG. 4 is a block diagram of a client apparatus according to a second embodiment of this invention.

Referring to FIG. 4, a client apparatus 10' according to a second embodiment of this invention is, for example, a personal computer or a PDA (Personal Digital Assistant) and comprises similar parts designated by like reference numerals.

The client apparatus 10' illustrated in FIG. 4 has a GPS (Global Positioning System) receiver 17' as a current position data output unit. The GPS receiver 17' receives a GPS signal from an artificial satellite and produces current position data representative of a current position of the client apparatus 10'.

In the client apparatus 10' in FIG. 4 also, the GPS receiver 17' may be replaced by a gyroscope for producing current position data representative of a current position of the client apparatus 10'.

Except the above, the client apparatus 10' in FIG. 4 is similar to the computer apparatus 10 in FIG. 1.

Figure 5:
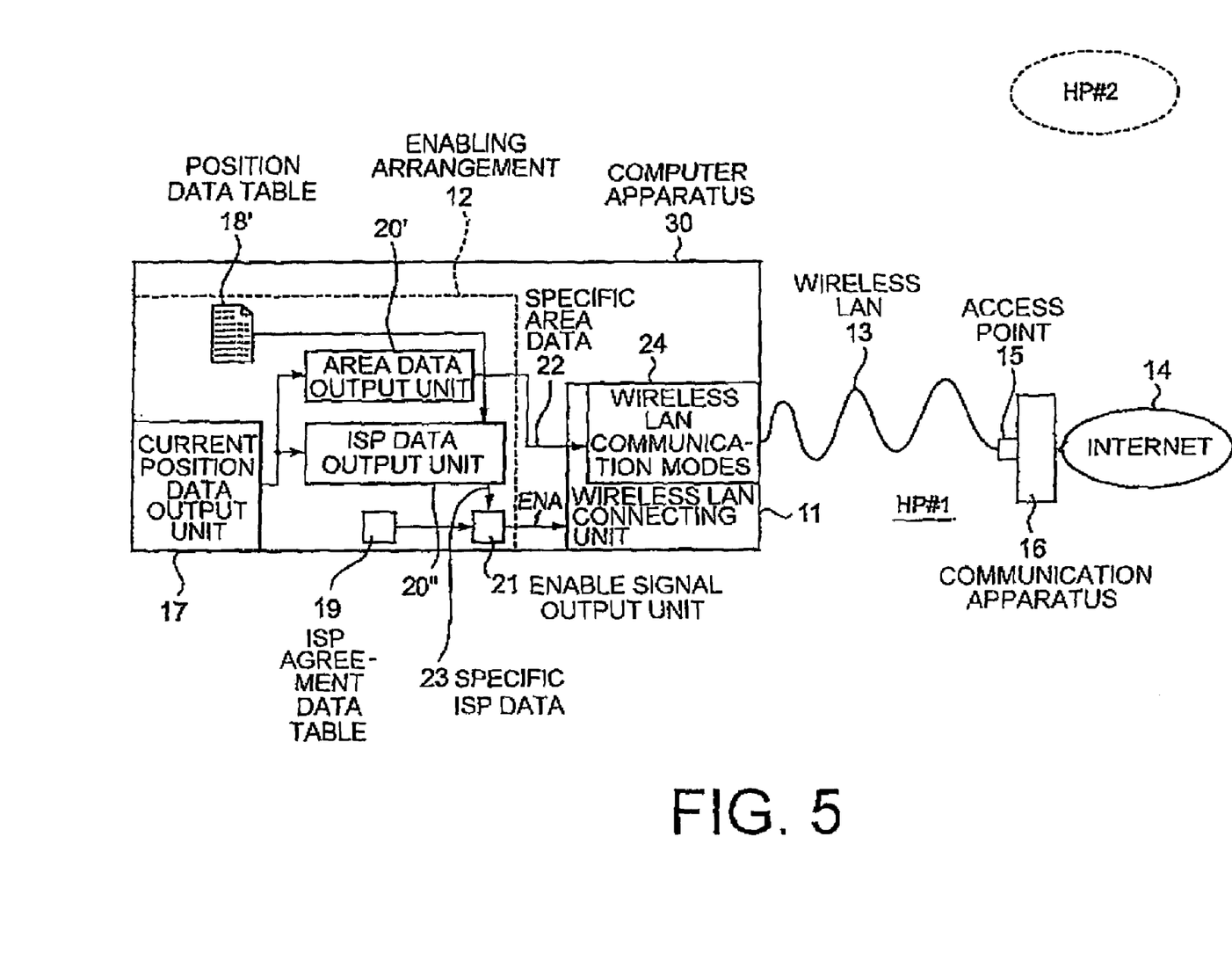
FIG. 5 is a block diagram of a computer apparatus according to a third embodiment of this invention.

Referring to FIG. 5, a computer apparatus 30 according to a third embodiment of this invention is, for example, a personal computer and is similar to the computer apparatus in FIG. 1 except the following.

In the computer apparatus 30 illustrated in FIG. 5, the position data table 18 in FIG. 1 is replaced by a position data table 18'. The area data and ISP data output unit 20 in FIG. 1 is replaced by an area data output unit 20' and an ISP data output unit 20''.

Figure 6:
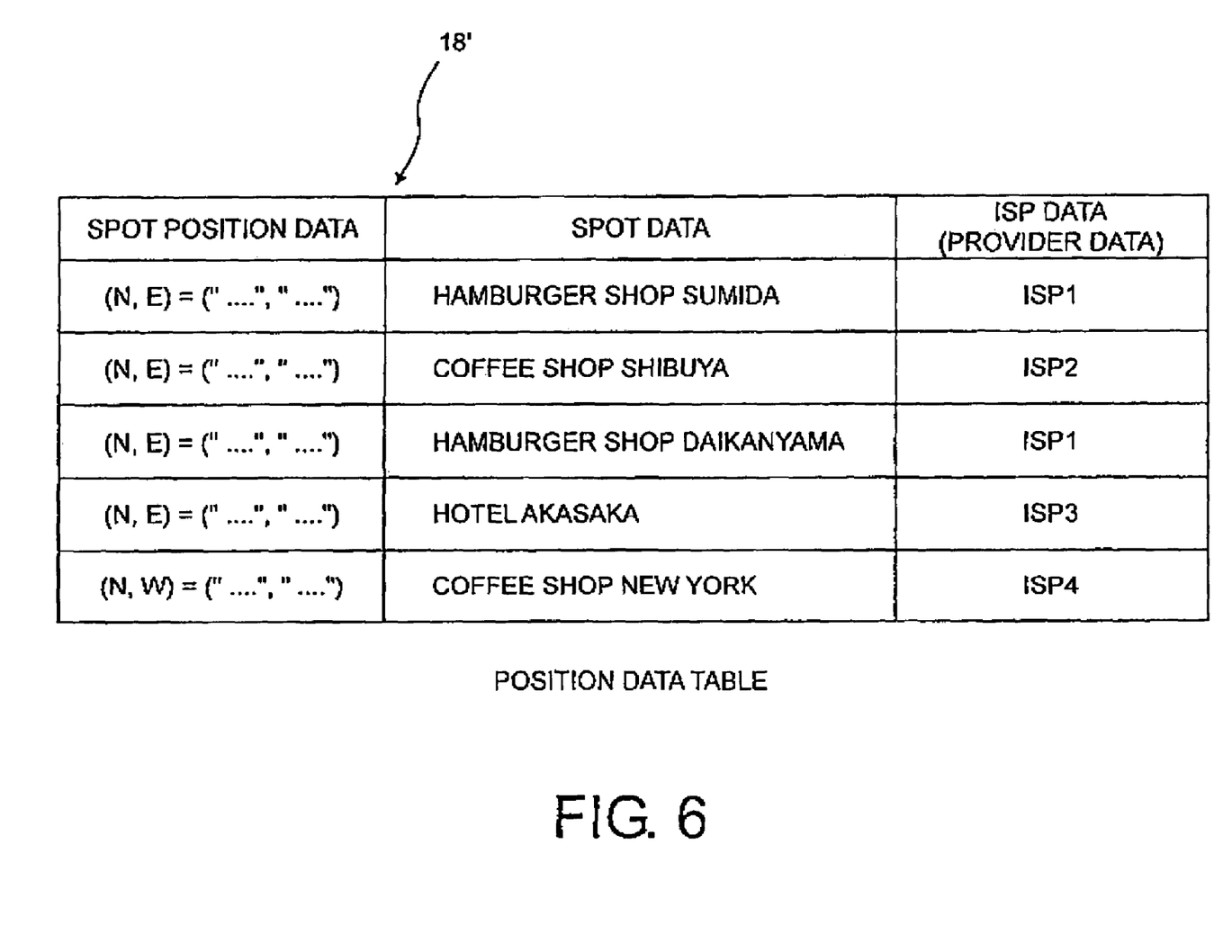
FIG. 6 shows a position data table used in the computer apparatus illustrated in FIG. 5.

Referring to FIG. 6 in addition to FIG. 5, the position data table 18' memorizes, in correspondence to the first and the second spot data representative of the first and the second providing spots HP#1 and HP#2 (assumed to be Hamburger Shop Sumida and Coffee Shop New York), first and second spot position data representative of the first and the second positions (north latitude N and east longitude E of Hamburger Shop Sumida and north latitude N and west longitude W of Coffee Shop New York), and the first and the second ISP data (provider data) representative of the first and the second ISPs (ISP1 and ISP4 in FIG. 2) hosting the first and the second providing spots HP#1 and HP#2. It is noted here that the position data table 18' in FIG. 6 does not memorize the first and the second area data (country data in FIG. 2) memorized in the position data table 18 illustrated in FIG. 2 and representative of the first and the second areas (country or state; Japan and U.S.A. in FIG. 2) including the first and the second providing spots HP#1 and HP#2.

Similarly, the position data table 18' memorizes the spot position data and the ISP data in correspondence to other providing spots (Coffee Shop Shibuya, Hamburger Shop Daikanyama, and Hotel Akasaka). It is noted here that the position data table 18' does not memorize the country data in the position data table 18 illustrated in FIG. 2.

For simplicity of description, it is assumed in the following description that the user of the computer apparatus 30 has an agreement only with the first and the second ISPs (ISP1 and ISP4) and that the ISP agreement data table 19 (FIG. 3) memorizes only the first and the second agreement data (setup data) corresponding to the first and the second ISP data representative of the first and the second ISPs (ISP1 and ISP4). Furthermore, the position data table 18' in FIG. 6 memorizes, in correspondence to the first and the second spot data representative of the first and the second providing spots HP#1 and HP#2 (Hamburger Shop Sumida and Coffee Shop New York), the first and the second spot position data representative of the first and the second positions (north latitude N and east longitude E of Hamburger Shop Sumida and north latitude N and west longitude W of Coffee Shop New York), and the first and the second ISP data representative of the first and the second ISPs (ISP1 and ISP4) hosting the first and the second providing spots HP#1 and HP#2.

In FIG. 5, the area data output unit 20' is supplied with the current position data from the current position data output unit 17 and produces the specific area data (specific country data) 22 representative of the specific area (specific country) including the current position.

Supplied with the current position data from the current position data output unit 17 and referring to the position data table 18 the ISP data output unit 20" identifies, as the specific spot data, one of the first and the second spot data which corresponds to one of the first and the second spot position data which coincides with the current position data. The ISP data output unit 20" produces, as specific ISP data 23, one of the first and the second ISP data which corresponds to the specific spot data.

Supplied with the specific ISP data 23 from the ISP data output unit 20" and referring to the ISP agreement data table 19, the enable signal output unit 21 produces an enable signal ENA in case where the ISP agreement data table 19 memorizes one of the first and the second agreement data in correspondence to one of the first and the second ISP data which coincides with the specific ISP data 23.

Supplied with the enable signal ENA from the enable signal output unit 21 and the specific area data 22 from the area data output unit 20', the wireless LAN connecting unit 11 automatically sets, as a selected communication mode, one of the wireless LAN communication modes 24 which corresponds to the specific area data 22 and carries out Internet connection via the wireless LAN 13 in the selected communication mode.

Figure 7:
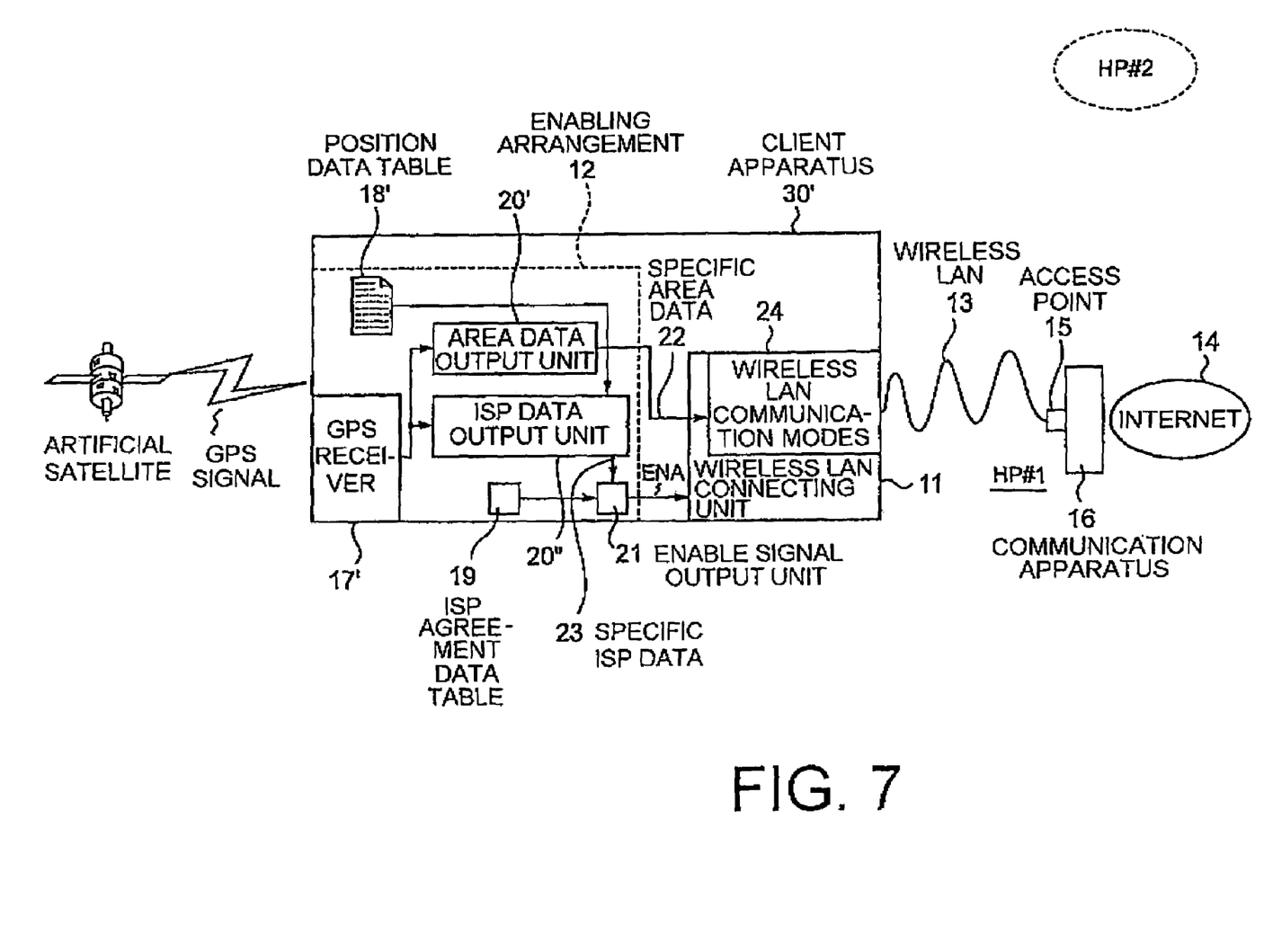
FIG. 7 is a block diagram of a client apparatus according to a fourth embodiment of this invention.

Referring to FIG. 7, a client apparatus 30' according to a fourth embodiment of this invention is, for example, a personal computer or a PDA (Personal Digital Assistant) and comprises similar parts designated by like reference numerals.

The client apparatus 30' illustrated in FIG. 7 has a GPS (Global Positioning system) receiver 17' as a current position data output unit. The GPS receiver 17' receives a GPS signal from an artificial satellite and produces current position data representative of a current position of the client apparatus 30'.

In the client apparatus 30' in FIG. 7 also, the GPS receiver 17' maybe replaced by a gyroscope for producing current position data representative of a current position of the client apparatus 30'.

Except the above, the client apparatus 30' in FIG. 7 is similar to the computer apparatus 30 in FIG. 5.

Figure 8:
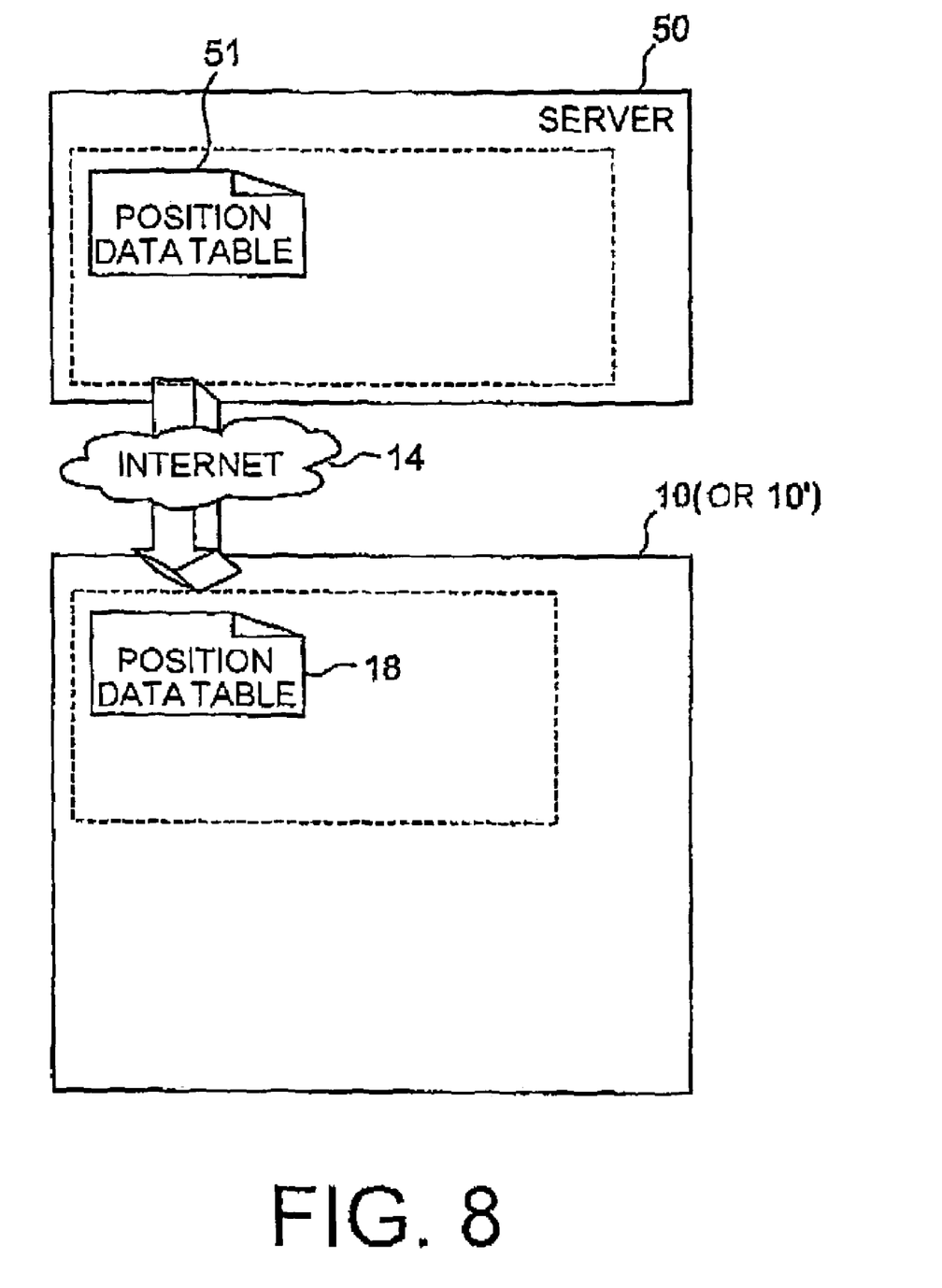
FIG. 8 is a block diagram for describing a method of updating the position data table used in the computer apparatus illustrated in FIG. 1 or the client apparatus illustrated in FIG. 4.

Next referring to FIG. 8, description will be made of a method of making the computer apparatus 10 (FIG. 1) or the client apparatus 10' (FIG. 4) update the position data table 18.

A server 50 connected to the Internet 14 is provided with a position data table 51 similar to the position data table 18 in FIG. 2 which memorizes the correspondence among the spot position data, the country data, the spot data, and the ISP data (provider data). If the position data table 51 is modified and updated, for example, by addition of a new providing spot (hot spot), the server 50 informs the update to the computer apparatus 10 (FIG. 1) or the client apparatus 10'.

If the update of the position data table 51 is informed from the server 50, the computer apparatus 10 (FIG. 1) or the client apparatus 10' (FIG. 4) informs the user of the update.

The computer apparatus 10 (FIG. 1) or the client apparatus 10' (FIG. 4) accesses to the server 50 via the Internet 14 and downloads the data of the position data table 51 from the server 50 to the computer apparatus 10 or the client apparatus 10'.

As described above, according to this invention, when the user brings the computer apparatus (or the client apparatus) having the wireless LAN connecting unit and the OPS receiver (or the gyroscope) to the providing spot (hot spot) and starts up the computer apparatus (or the client apparatus), the area data of the current position are changed in accordance with the current position data received by the GPS receiver (or produced by the gyroscope) and informed to the wireless LAN connecting unit. In response to the current position data, the providing spot (hot spot) including the current position is identified and the wireless LAN connecting unit is automatically adapted to the ISP different at each providing spot (hot spot).

With reference to a setting table set in the wireless LAN connecting unit and memorizing the radio frequency channel and the transmit power level, a setting which matches the radio laws and regulations and the wireless specification of the area including the current position is extracted in accordance with the area data.

The setting thus extracted is incorporated into the wireless LAN connecting unit so that the wireless LAN connecting unit can be immediately used at a wireless LAN access point visited by the user in order to repeatedly perform wireless LAN connection.

The user can immediately use the computer apparatus (or the client apparatus) to access to the wireless LAN without being conscious of the movement among the providing spots (hot spots) and without changing, by himself, the network setting, agreement setting, and charging information of a client system.

As described above, according to this invention, there is provided a computer apparatus (or a client apparatus) having a wireless LAN connecting unit, which comprises a current position data acquiring unit for acquiring current position data representative of a current position of the computer apparatus (or the client apparatus), and which is capable of identifying a current-location area (country or state) from the current position data and automatically changing a setting of a wireless LAN communication mode (determined by a radio frequency channel and a transmit power level) in conformity with a wireless specification and radio laws and regulations of each area.

According to this invention, there is provided a computer apparatus (or a client apparatus) having a wireless LAN connecting unit, which comprises a current position data acquiring unit for acquiring current position data representative of a current position of the computer apparatus (or the client apparatus), and which is capable of identifying a current-location providing spot (hot spot) from the current position data and automatically adapting the wireless LAN connecting unit to an ISP different at each providing spot (hot spot) without the need of manually changing ISP agreement data.

What is claimed is:

1. A computer apparatus comprising:
    a wireless LAN connecting unit for carrying out Internet connection via a wireless LAN; and
    an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;
    the enabling arrangement comprising:
    a current position data output unit for producing current position data representative of a current position of the computer apparatus;
    a position data table memorizing, in correspondence to first and second spot data representative of the first and the second providing spots, first and second spot position data representative of the first and the second positions, first and second area data representative of first and second areas including the first and the second providing spots, and first and second ISP data representative of the first and the second ISPs hosting the first and the second providing spots;
    an ISP agreement data table memorizing, in correspondence to the first and the second ISP data representative of the first and the second ISPs, first and second agreement data representative of agreements made between a user of the computer apparatus and the first and the second ISPs;
    an area data and ISP data output unit, responsive to the current position data and referring to the position data table, for identifying as specific spot data one of the first and the second spot data which corresponds to one of the first and the second spot position data which coincides with the current position data, producing as specific area data one of the first and the second area data which corresponds to the specific spot data, and producing as specific ISP data one of the first and the second ISP data which corresponds to the specific spot data; and
    an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;
    the wireless LAN connecting unit being preliminarily given a plurality of wireless LAN communication modes corresponding to a plurality of area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

2. A computer apparatus as claimed in claim 1, wherein:
    each of the radio LAN communication modes corresponding to the area data is determined by a radio frequency channel and a transmit power level used in the area represented by the area data corresponding thereto;
    the wireless LAN connecting unit carrying out Internet connection via the wireless LAN by the use of the radio frequency channel and the transmit power level which determine the selected communication mode.

3. A computer apparatus as claimed in claim 1, wherein:
    the current position data output unit is a GPS (Global Positioning System) receiver responsive to a GPS signal for producing the current position data representative of the current position of the computer apparatus.

4. A computer apparatus as claimed in claim 1, wherein:
    the current position data producing unit is a gyroscope for producing the current position data representative of the current position of the computer apparatus.

5. A computer apparatus comprising:
    a wireless LAN connecting unit for carrying out Internet connection via a wireless LAN; and
    an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;
    the enabling arrangement comprising:
    a current position data output unit for producing current position data representative of a current position of the computer apparatus;
    a position data table memorizing, in correspondence to first and second spot data representative of the first and the second providing spots, first and second spot position data representative of the first and the second positions, first and second country data representative of first and second countries including the first and the second providing spots, and first and second ISP data representative of the first and the second ISPs hosting the first and the second providing spots;
    an ISP agreement data table memorizing, in correspondence to the first and the second ISP data representative of the first and the second ISPs, first and second agreement data representative of agreements made between a user of the computer apparatus and the first and the second ISPs;
    a country data and ISP data output unit, responsive to the current position data and referring to the position data table, for identifying as specific spot data one of the first and the second spot data which corresponds to one of the first and the second spot position data which coincides with the current position data, producing as specific country data one of the first and the second country data which corresponds to the specific spot data, and producing as specific ISP data one of the first and the second ISP data which corresponds to the specific spot data; and
    an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of country data, the wireless LAN connecting unit being responsive to the enable signal and the specific country data and automatically setting, as a selected communication mode, one of the wireless LAN communication modes which corresponds to the specific country data to carry out Internet connection via the wireless LAN in the selected communication mode.

6. A computer apparatus as claimed in claim 5, wherein:

each of the radio LAN communication modes corresponding to the country data is determined by a radio frequency channel and a transmit power level used in the country represented by the country data corresponding thereto;

the wireless LAN connecting unit carrying out Internet connection via the wireless LAN by the use of the radio frequency channel and the transmit power level which determine the selected communication mode.

7. A computer apparatus as claimed in claim 5, wherein:

the current position data output unit is a GPS (Global Positioning System) receiver responsive to a GPS signal for producing the current position data representative of the current position of the computer apparatus.

8. A computer apparatus as claimed in claim 5, wherein:

the current position data producing unit is a gyroscope for producing the current position data representative of the current position of the computer apparatus.

9. A computer apparatus comprising:

a wireless LAN connecting unit for carrying out Internet connection via a wireless LAN; and an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;

the enabling arrangement comprising:

a current position data output unit for producing current position data representative of a current position of the computer apparatus;

an area data output unit supplied with the current position data for producing specific area data representative of a specific area including the current position;

a position data table memorizing, in correspondence to first and second spot data representative of the first and the second providing spots, first and second spot position data representative of the first and the second positions, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the computer apparatus and the first and the second ISPs;

an ISP data output unit, responsive to the current position data and referring to the position data table, for identifying as specific spot data one of the first and the second spot data which corresponds to one of the first and the second spot position data which coincides with the current position data, and producing as specific ISP data one of the first and the second ISP data which corresponds to th specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

10. A computer apparatus as claimed in claim 9, wherein:

each of the radio LAN communication modes corresponding to the area data is determined by a radio frequency channel and a transmit power level used in the area represented by the area data corresponding thereto;

the wireless LAN connecting unit carrying out Internet connection via the wireless LAN by the use of the radio frequency channel and the transmit power level which determine the selected communication mode.

11. A computer apparatus as claimed in claim 9, wherein:

the current position data output unit is a GPS (Global Positioning System) receiver responsive to a GPS signal for producing the current position data representative of the current position of the computer apparatus.

12. A computer apparatus as claimed in claim 9, wherein:

the current position data producing unit is a gyroscope for producing the current position data representative of the current position of the computer apparatus.

13. A client apparatus comprising:

a wireless LAN connecting unit for carrying out Internet connection via a wireless LAN; and an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;

the enabling arrangement comprising:

a current position data output unit for producing current position data representative of a current position of the client apparatus;

a position data table memorizing, in correspondence to first and second spot data representative of the first and the second providing spots, first and second spot position data representative of the first and the second positions, first and second area data representative of first and second areas including the first and the second providing spots, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the client apparatus and the first and the second ISPs;

an area data and ISP data output unit, responsive to the current position data and referring to the position data table, for identifying as specific spot data one of the first and the second spot data which corresponds to one of the first and the second spot position data which coincides with the current position data, producing as specific area data one of the first and the second area data which corresponds to the specific spot data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

14. A client apparatus as claimed in claim 13, wherein:
each of the radio LAN communication modes corresponding to the area data is determined by a radio frequency channel and a transmit power level used in the area represented by the area data corresponding thereto;
the wireless LAN connecting unit carrying out Internet connection via the wireless LAN by the use of the radio frequency channel and the transmit power level which determine the selected communication mode.

15. A client apparatus as claimed in claim 13, wherein:
the current position data output unit is a GPS (Global Positioning System) receiver responsive to a GPS signal for producing the current position data representative of the current position of the client apparatus.

16. A client apparatus as claimed in claim 13, wherein:
the current position data producing unit is a gyroscope for producing the current position data representative of the current position of the client apparatus.

17. A client apparatus comprising:
a wireless LAN connecting unit for carrying out Internet connection via a wireless LAN; and
an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;
the enabling arrangement comprising:
a current position data output unit for producing current position data representative of a current position of the client apparatus;
a position data table memorizing, in correspondence to first and second spot data representative of the first and the second providing spots, first and second spot position data representative of the first and the second positions, first and second country data representative of first and second countries including the first and the second providing spots, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the client apparatus and the first and the second ISPs;

a country data and ISP data output unit, responsive to the current position data and referring to the position data table, for identifying as specific spot data one of the first and the second spot data which corresponds to one of the first and the second spot position data which coincides with the current position data, producing as specific country data one of the first and the second country data which corresponds to the specific spot data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of country data, the wireless LAN connecting unit being responsive to the enable signal and the specific country data and automatically setting, as a selected communication mode, one of the wireless LAN communication modes which corresponds to the specific country data to carry out Internet connection via the wireless LAN in the selected communication mode.

18. A client apparatus as claimed in claim 17, wherein:
each of the radio LAN communication modes corresponding to the country data is determined by a radio frequency channel and a transmit power level used in the country represented by the country data corresponding thereto;
the wireless LAN connecting unit carrying out Internet connection via the wireless LAN by the use of the radio frequency channel and the transmit power level which determine the selected communication mode.

19. A client apparatus as claimed in claim 17, wherein:
the current position data output unit is a GPS (Global Positioning System) receiver responsive to a GPS signal for producing the current position data representative of the current position of the client apparatus.

20. A client apparatus as claimed in claim 17, wherein:
the current position data producing unit is a gyroscope for producing the current position data representative of the current position of the client apparatus.

21. A client apparatus comprising:
a wireless LAN connecting unit for carrying out Internet connection via a wireless LAN; and
an enabling arrangement enabling the wireless LAN connecting unit to carry out the Internet connection via the wireless LAN at either of first and second providing spots which are spaces located at first and second positions different from each other and providing wireless Internet connection services hosted by first and second ISPs (Internet Service Providers) different from each other;

the enabling arrangement comprising:

a current position data output unit for producing current position data representative of a current position of the client apparatus;

an area data output unit supplied with the current position data for producing specific area data representative of a specific area including the current position;

a position data table memorizing, in correspondence to first and second spot data representative of the first and the second providing spots, first and second spot position data representative of the first and the second positions, and first and second ISP data representative of the first and the second ISPs hosting the first and the second providing spots;

an ISP agreement data table memorizing, in correspondence to the first and the second ISP data representative of the first and the second ISPs, first and second agreement data representative of agreements made between a user of the client apparatus and the first and the second ISPs;

an ISP data output unit, responsive to the current position data and referring to the position data table, for identifying as specific spot data one of the first and the second spot data which corresponds to one of the first and the second spot position data which coincides with the current position data, and producing as specific ISP data one of the first and the second ISP data which corresponds to the specific spot data; and an enable signal output unit, responsive to the specific ISP data and referring to an ISP agreement data table, for producing an enable signal if the ISP agreement data table memorizes one of the first and the second agreement data in correspondence to one of the first and the second ISP data which coincides with the specific ISP data;

the wireless LAN connecting unit being preliminarily given a plurality of wireless LAN communication modes corresponding to a plurality of area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

22. A client apparatus as claimed in claim 21, wherein:
each of the radio LAN communication modes corresponding to the area data is determined by a radio frequency channel and a transmit power level used in the area represented by the area data corresponding thereto;
the wireless LAN connecting unit carrying out Internet connection via the wireless LAN by the use of the radio frequency channel and the transmit power level which determine the selected communication mode.

23. A client apparatus as claimed in claim 21, wherein:
the current position data output unit is a GPS (Global Positioning System) receiver responsive to a GPS signal for producing the current position data representative of the current position of the client apparatus.

24. A client apparatus as claimed in claim 21, wherein:
the current position data producing unit is a gyroscope for producing the current position data representative of the current position of the client apparatus.

25. An electronic apparatus (10 or 10') comprising:
a wireless LAN connecting unit (11) for carrying out Internet connection via a wireless LAN (13); and
an enabling arrangement (12) enabling the wireless LAN connecting unit to carry out the Internet connection via the wireless LAN at either of first and second providing spots (HP#1 and HP#2) which are spaces located at first and second positions different from each other and providing wireless Internet connection services hosted by first and second ISPs (Internet Service Providers) different from each other;

the enabling arrangement comprising:

a current position data output unit (17) for producing current position data representative of a current position of the electronic apparatus;

a position data table (18) memorizing, in correspondence to first and second spot data representative of the first and the second providing spots, first and second spot position data representative of the first and the second positions, first and second area data representative of first and second areas including the first and the second providing spots, and first and second ISP data representative of the first and the second ISPs hosting the first and the second providing spots;

an ISP agreement data table (19) memorizing, in correspondence to the first and the second ISP data representative of the first and the second ISPs, first and second agreement data representative of agreements made between a user of the electronic apparatus and the first and the second ISPs;

an area data and ISP data output unit (20), responsive to the current position data and referring to the position data table, for identifying as specific spot data one of the first and the second spot data which corresponds to one of the first and the second spot position data which coincides with the current position data, producing as specific area data (22) one of the first and the second area data which corresponds to the specific spot data, and producing as specific ISP data (23) one of the first and the second ISP data which corresponds to the specific spot data; and an enable signal output unit (21), responsive to the specific ISP data and referring to an ISP agreement data table, for producing an enable signal (ENA) if the ISP agreement data table memorizes one of the first and the second agreement data in correspondence to one of the first and the second ISP data which coincides with the specific ISP data;

the wireless LAN connecting unit being preliminarily given at least two wireless LAN communication modes (24) corresponding to at least two area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

26. An electronic apparatus as claimed in claim 25, wherein:
said position data table memorizes, as the first and the second area data representative of said first and said second areas, first and second country data representative of first and second countries including the first and the second providing spots.

27. An electronic apparatus (30 or 30') comprising:
a wireless LAN connecting unit (11) for carrying out Internet connection via a wireless LAN (13); and
an enabling arrangement (12) enabling the wireless LAN connecting unit to carry out the Internet connection via the wireless LAN at either of first and second providing spots (HP#1 and HP#2) which are spaces located at first and second positions different from each other and providing wireless Internet connection services hosted by first and second ISPs (Internet Service Providers) different from each other;
the enabling arrangement comprising:
a current position data output unit (17) for producing current position data representative of a current position of the electronic apparatus;
a position data table (18') memorizing, in correspondence to first and second spot data representative of the first and the second providing spots, first and second spot position data representative of the first and the second positions, and first and second ISP data representative of the first and the second ISPs hosting the first and the second providing spots;
an ISP agreement data table (19) memorizing, in correspondence to the first and the second ISP data representative of the first and the second ISPs, first and second agreement data representative of agreements made between a user of the electronic apparatus and the first and the second ISPs;
an ISP data output unit (20"), responsive to the current position data and referring to the position data table, for identifying as specific spot data one of the first and the second spot data which corresponds to one of the first and the second spot position data which coincides with the current position data, and producing as specific ISP data (23) one of the first and the second ISP data which corresponds to the specific spot data;
an enable signal output unit (21), responsive to the specific ISP data and referring to an ISP agreement data table, for producing an enable signal (ENA) if the ISP agreement data table memorizes one of the first and the second agreement data in correspondence to one of the first and the second ISP data which coincides with the specific ISP data; and
an area data output unit (20') supplied with the current position data for producing specific area data (22) representative of a specific area including the current position;
the wireless LAN connecting unit being preliminarily given at least two wireless LAN communication modes (24) corresponding to at least two area data, the wireless LAN connecting unit being responsive to the enable signal and the specific area data and automatically setting, as a selected communication mode, one of the wireless LAN communication modes which corresponds to the specific area data to carry out Internet connection via the wireless LAN in the selected communication mode.

28. An electronic apparatus as claimed in any one of claims 25 and 27, wherein:
each of the radio LAN communication modes corresponding to the area data is determined by a radio frequency channel and a transmit power level used in the area represented by the area data corresponding thereto;
the wireless LAN connecting unit carrying out Internet connection via the wireless LAN by the use of the radio frequency channel and the transmit power level which determine the selected communication mode.

29. An electronic apparatus as claimed in any one of claims 25 and 27, wherein:
the current position data output unit is a GPS (Global Positioning System) receiver (17') responsive to a GPS signal for producing the current position data representative of the current position of the electronic apparatus.

30. An electronic apparatus as claimed in any one of claims 25 and 27, wherein:
the current position data producing unit is a gyroscope for producing the current position data representative of the current position of the electronic apparatus.

31. An electronic apparatus as claimed in any one of claims 25 and 27, wherein:
said electronic apparatus is a computer apparatus.

32. An electronic apparatus as claimed in any one of claims 25 and 27, wherein:
said electronic apparatus is a PDA (Personal Digital Assistant).

33. An electronic apparatus as claimed in anyone of claims 25 and 27, wherein:
said electronic apparatus is a client computer.

* * * * *